Aug. 30, 1966   D. R. HARTWIG   3,269,749
WHEELED HITCH DEVICE FOR TOWING A PAIR OF TRAILING UNITS
Filed Oct. 2, 1964   2 Sheets-Sheet 1

INVENTOR.
DONALD R. HARTWIG
BY
*John E. Thompson*
ATTORNEY

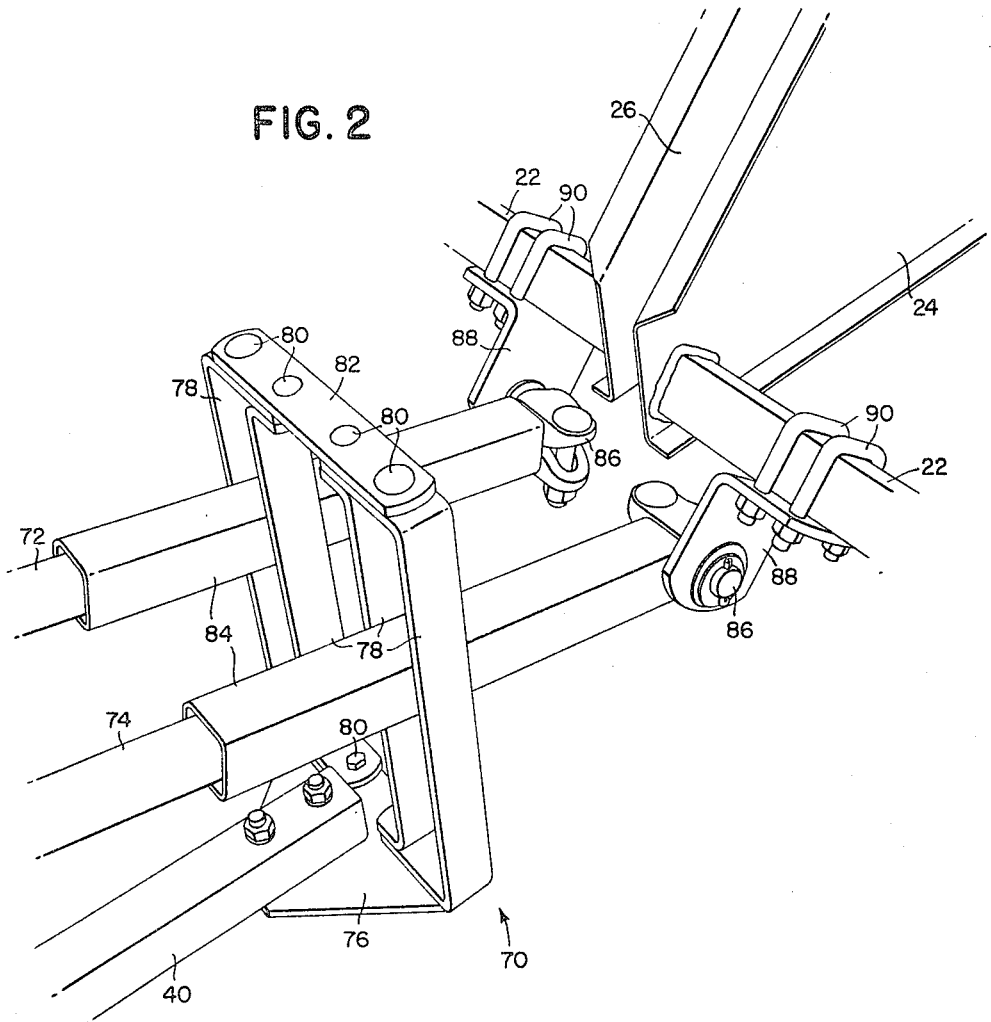

United States Patent Office 3,269,749
Patented August 30, 1966

3,269,749
WHEELED HITCH DEVICE FOR TOWING A PAIR OF TRAILING UNITS
Donald R. Hartwig, Rock Island, Ill., assignor to Deere & Company, Moline, Ill., a corporation of Delaware
Filed Oct. 2, 1964, Ser. No. 401,205
6 Claims. (Cl. 280—411)

The present invention relates generally to hitch devices, and more particularly to hitch devices for interconnecting two agricultural units with a propelling device such as the conventional farm tractor.

It is an object of the present invention to provide a hitch device suitable for interconnecting two generally transversely disposed agricultural units to a single propelling vehicle. More specifically, it is an object of the present invention to provide a hitch device to which two transversely extending units can be secured, in which means are provided on the hitch device for permitting independent up and down or vertical movement of the transversely extending units while holding them in spaced horizontal relationship.

Another object of the present invention is to provide a hitch device for a plurality of implements in which the implements can be secured relatively closely to the propelling farm tractor while still permitting clearance for tractor turning when the wheels of the tractor are widely spaced.

These and other objects and advantages of this invention will be apparent to those skilled in the art after a consideration of the following detailed description, taken in conjunction with the accompanying drawings, in which the preferred form of this invention is illustrated.

FIG. 2 is an enlarged perspective view of a portion of applicant's hitch device.

Figure 1:
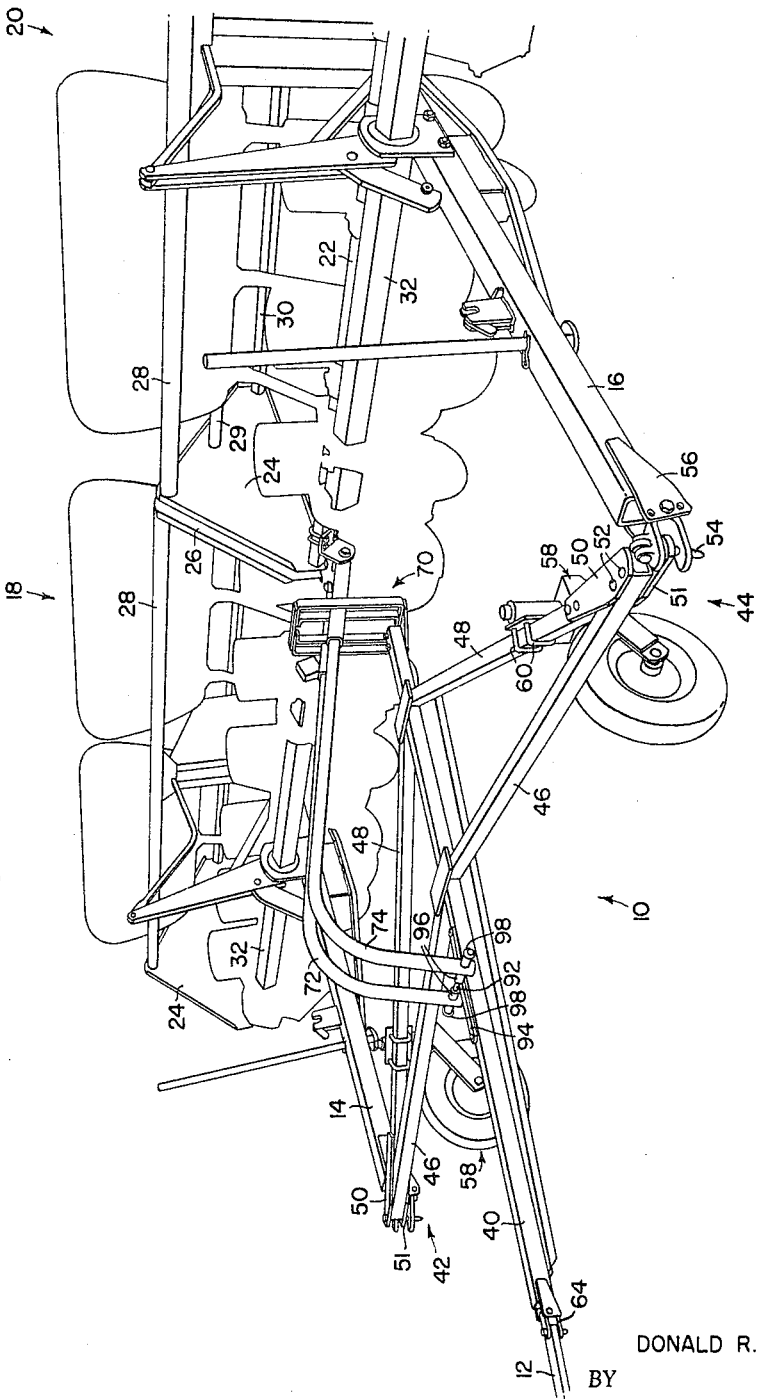
FIG. 1 is a perspective view of the hitch device of the present invention, the hitch device being secured to a tractor drawbar and in turn having two planting and fertilizing units secured to spaced apart portions of the hitch device.

In the following description, right-hand and left-hand reference is determined by standing to the rear of the hitch device and facing the direction of travel.

Referring first to FIG. 1, the hitch device, indicated generally at 10, is shown to a tractor drawbar 12. The hitch device 10 in turn has secured to it the drawbars 14 and 16 of right- and left-hand planting and fertilizing units 18 and 20, respectively. The fertilizing and planting units illustrated are of the type shown in applicant's copending application U.S. Ser. No. 319,139, filed October 28, 1963. However, it should be noted that applicant's hitch device is designed to have secured to it any two transversely extending agricultural implements in which it is desirable to maintain a fixed spacing between the implements while permitting independent up-and-down movement of the units.

The drawbars of the agricultural units 18 and 20 are mounted on transversely extending front frame members 22 in a manner not material here. The transverse member 22 is rigidly secured, as by welding, to right- and left-hand triangularly shaped end frame members 24 and 26, respectively. Other transversely extending frame members 28, 29 and 30 may be secured between the right- and left-hand frame members. Also, a rockshaft 32 may be secured to the forwardly extending drawbars and the transverse frame members for a rocking movement, the rockshaft in turn carrying ground-engaging wheels by which the fertilizing and planting unit may be raised and lowered.

Applicant's hitch device includes a principal longitudinally extending main frame member 40 to which are secured outwardly projecting right- and left-hand members indicated generally at 42 and 44, respectively, to which are secured the right and left drawbars 14, 16, respectively. Each outwardly extending member includes a front frame bar 46 which is rigidly secured at its inner end to the frame member 40 and extends outwardly and forwardly therefrom as best can be seen in FIG. 1, and a rear frame bar 48 which is secured at its inner end to the main frame bar and extends forwardly and outwardly to upper and lower gusset plates 50, 51 to which it is secured in a conventional manner, the gusset plate being in turn secured by bolts 52 to the front frame bar. The lower gusset plate 51 extends outwardly beyond the end of the associated front frame bar and is apertured to receive the hitch pin 54 by which the clevis 56 of the drawbar 14 or 16 is secured to the hitch. The right and left members 42 and 44, respectively, are supported castering land wheel assemblies 58, the wheel assemblies being supported on the rear frame bars 48 by conventional U-bolts 60.

The forward end of the principal longitudinally extending main frame member is secured to the tractor drawbar by means of conventional clevis means 64.

Secured to the rear of the main frame member 40 is a guide assembly indicated generally at 70 which receives and guides auxiliary right- and left-hand draft bars 72 and 74, respectively. The guide assembly, as can best be seen in FIG. 2, includes four upwardly extending bars 78, the outer two bars being spaced a predetermined distance from the inner two bars. The lower ends of the bars 78 are secured to a lower triangular plate 76, which is bolted or otherwise secured to the main frame 40, and the upper ends of the bars 78 are secured to a generally transversely extending strap 82 by means of conventional bolts 80. The rearward ends of the right- and left-hand draft bars 72, 74 which are circular in cross section, are disposed within box beams 84 whose outer faces bear against the inner and outer surfaces of the outer and inner pairs of bars 78, respectively. The rear end of the draft bars 72 and 74 are secured to the left- and right-hand ends of the right- and left-hand agricultural units 14 and 16, respectively. To this end a bearing member 86, which carried by an angle bracket 88, is secured to the rear of each of the draft bars 72 and 74. U-bolts 90 in turn secure the angle brackets to the front members 22.

The forward ends of the draft bars 72 and 74 are secured to the main frame member 40 by a generally transversely extending pin 92 which is welded to a strap 94 that is in turn bolted to the frame member 40. The outer ends of the pin 92 are received within sleeves 96 carried by the lower forward ends of the draft bars 72 and 74. The pin 92 is held within the sleeves 96 by conventional fastener means 98.

In operation the hitch is secured to a tractor drawbar 12, and the drawbars 14 and 16 of the transverse planter units 18 and 20 are secured to the apertures in the gusset plates 51. Additionally, the adjacent ends of the two planting and fertilizing units are secured to the draft bars 72 and 74. As can best be seen from FIG. 1 these draft bars initially extend upwardly from the main frame member 40 and then rearwardly and downwardly towards the transverse frame member 22 of the associated planting and fertilizing unit, to which they are secured. When the planting units are propelled forwardly, they will be held a fixed distance by the draft bars 72, 74 which cooperate with the associated guide assembly 70 to hold the outer ends a fixed distance apart. However, independent vertical movement of the two units will be permitted by the guide assembly 70 since the box beams 84 can move upwardly and downwardly within the associated bars 78.

Also, it should be noted, that by having the front outwardly extending bar 46 evtending forwardly as well as outwardly that the hitch points of the planting and fertilizing units may be more closely disposed with respect to the rear wheels of a tractor. Thus, when the tractor turns, the rear wheels may go into that space which would normally be occupied by the forward bar if it extended at right angles from the main frame member 40.

While the preferred structure in which the principles of the present invention have been incorporated is shown and described above, it is to be understood that the invention is not to be limited to the particular details shown and described above, but that, in fact, widely different means may be employed in the practice of the broader aspects of the invention.

What is claimed is:

1. A hitch device for interconnecting a tractor drawbar with two transversely extending ground-engaging devices each having a forwardly extending drawbar, the hitch device being adapted to maintain the ground-engaging devices a fixed transverse distance apart from each other while permitting independent up and down movement, said hitch device comprising: a longitudinally extending main frame member, outwardly and forwardly extending right- and left-hand frame bars rigidly secured of their inner ends to an intermediate portion of said main frame member, outer wheel assemblies mounted on and supporting the outer end portions of said right- and lef-hand frame bars, means mounted on the outer ends of said right- and left-hand frame bars to which the drawbars of the ground-engaging devices may be secured, a guide assembly carried on the rear end portion of said main frame member, right- and left-hand draft means passing through said assembly, the forward end of said draft means being secured to said main frame member about transversely extending pivot means, and means carried by the rear ends of said draft means and adapted to be secured to said ground-engaging device.

2. The invention set forth in claim 1 in which said guide assembly comprises outer and inner pairs of inwardly extending bars rigidly secured at their lower ends to said longitudinally extending main frame member, the associated outer and inner bars being held a fixed distance from each other.

3. A hitch device for interconnecting right- and left-hand trailing implements with a tractor comprising: a longitudinally extending main frame member, right- and left-hand outwardly extending frame bars rigidly secured at their inner ends to said main frame member, means mounted on the outer ends of each of said frame bars to which a forward portion of said trailing implements may be secured, right- and left-hand longitudinally extending draft bars pivotally secured at their forward end to said main frame member, and means mounted on the outer end of said draft bars to which right- and left-hand portions of said left- and right-hand trailing implements may be secured, respectively.

4. The invention set forth in claim 3 in which means are provided on said longitudinally extending main frame for guiding a rearward portion of said draft bars whereby the ends of said draft bars are held a fixed distance from each other, said guide means including spaced apart pairs of right- and left-hand bars between which said draft bars are disposed in interengaged guiding contact.

5. The invention set forth in claim 3 in which said frame bars are secured to an intermediate portion of said main frame member and extend outwardly and forwardly therefrom.

6. The combination of right- and left-hand ground-engaging devices and an interconnected hitch device, each of said ground-engaging devices including a forwardly extending draft frame and a transverse supporting structure rigidly interconnected with said forwardly extending draft frame, said hitch device including a longitudinally extending main frame member, right- and left-hand outwardly extending frame bars secured at their inner ends to said main frame member, means mounted on the outer ends of said right- and left-hand frame bars to which are secured the forwardly extending draft frame of the right- and left-hand ground-engaging devices, respectively, right- and left-hand longitudinally extending draft bars pivotally mounted at their forward ends to said main frame member, means holding the rear ends of said right- and left-hand draft bars in fixed spaced apart relation, and means mounted on the rear end of said right- and left-hand draft bars to which are secured the transverse frames of the right- and left-hand ground-engaging devices, respectively.

References Cited by the Examiner

UNITED STATES PATENTS

| | | | |
|---|---|---|---|
| 1,837,526 | 12/1931 | Botsford | 172—310 |
| 1,923,259 | 8/1933 | Erdman | 111—52 |
| 2,074,419 | 3/1937 | Opolo | 280—411 |
| 2,139,200 | 12/1938 | Moyer | 56—7 |
| 2,319,751 | 5/1943 | Silver | 280—411 |
| 2,709,085 | 5/1955 | Stueland | 280—412 |

LEO FRIAGLIA, *Primary Examiner*.